Dec. 25, 1923.
E. H. BELDEN
SPEEDOMETER
Filed April 25, 1918    2 Sheets-Sheet 1
1,478,372
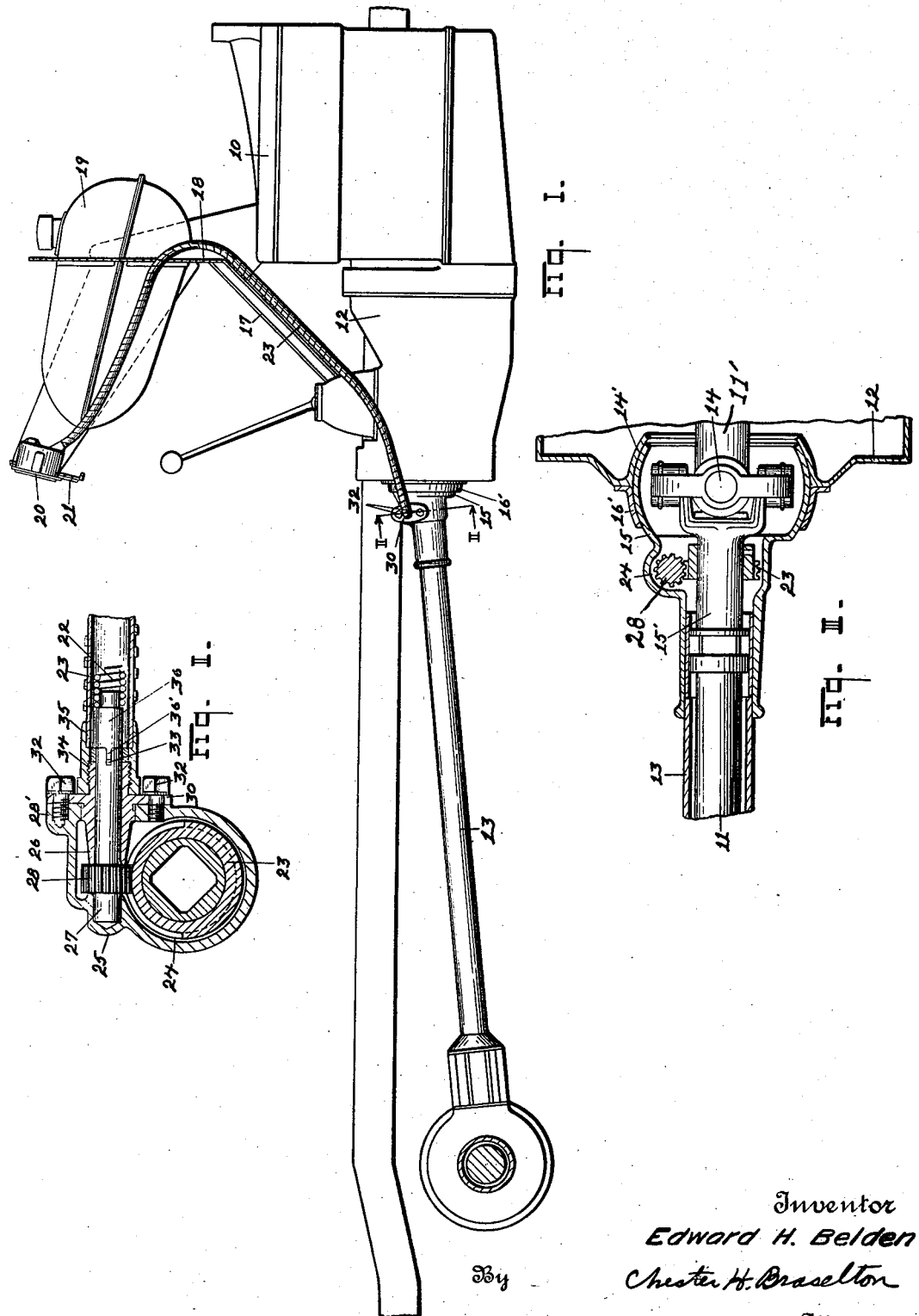

Dec. 25, 1923.
E. H. BELDEN
SPEEDOMETER
1,478,372
Filed April 25, 1918    2 Sheets-Sheet 2
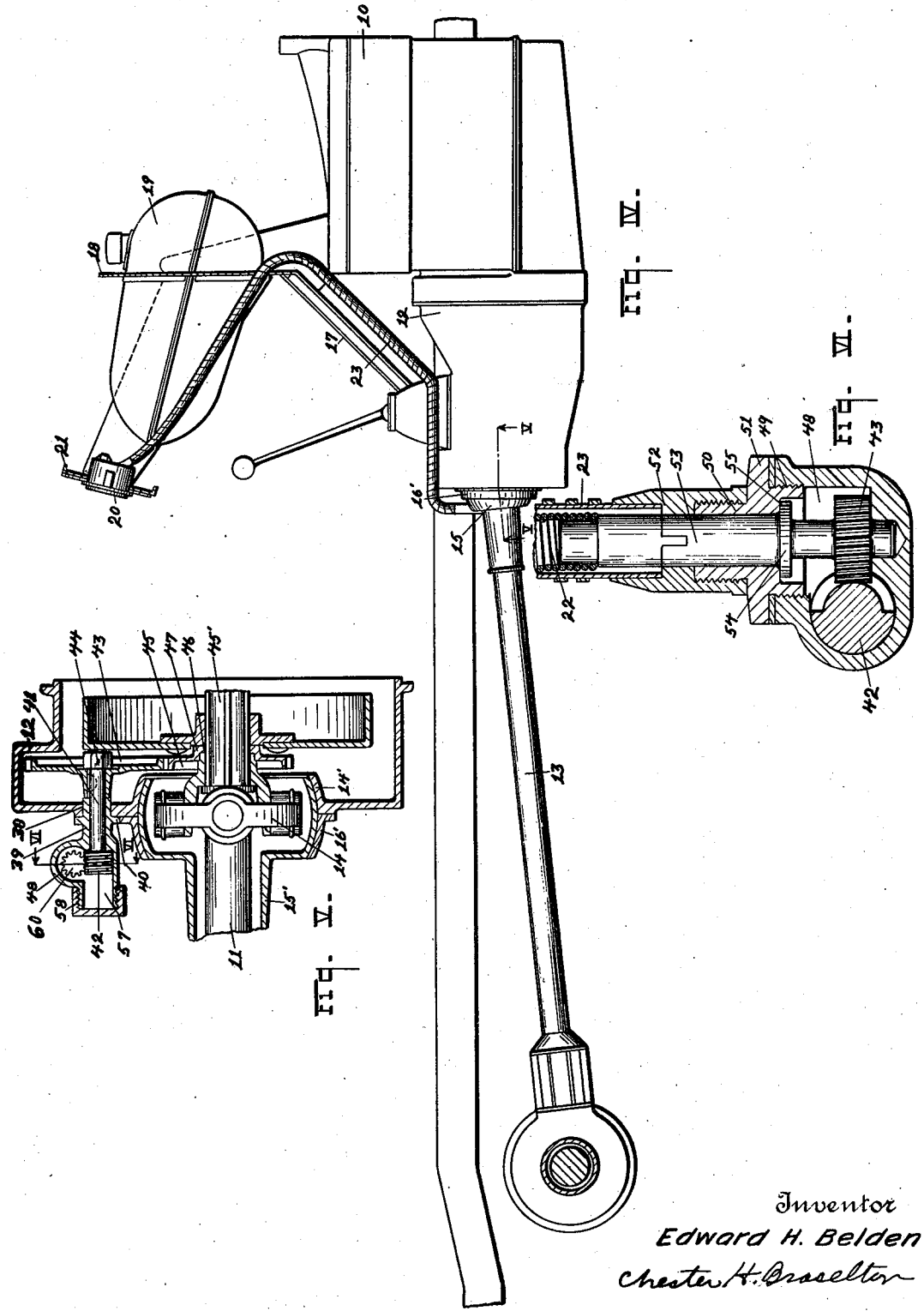
Inventor
Edward H. Belden
Chester H. Braselton
Attorney Patented Dec. 25, 1923.

1,478,372

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPEEDOMETER.

Application filed April 25, 1918. Serial No. 230,747.

*To all whom it may concern:*

Be it known that I, EDWARD H. BELDEN, a citizen of the United States, residing at Toledo, in the county of Lucas and State of Ohio, have invented certain new and useful Improvements in Speedometers, of which I declare the following to be a full, clear, and exact description.

This invention relates to speedometers, and more particularly to means for operatively connecting the drive train of a speedometer to the power shaft of a motor vehicle.

The invention has for its primary object, to provide such a means whereby the speedometer on motor vehicles can be actuated from the power shaft and thereby secure a more steady action and eliminate any possibility of inaccuracy in the registration of the speedometer.

It is also a general object of my invention that the actuating and connecting means as above characterized, will be of a simple and durable construction, consisting relatively of few parts and which may be manufactured and applied to motor vehicles or otherwise at a relatively small cost.

A further object of the invention is to provide an improved form of shaft mounting which may with facility be applied to any portion of the main power shaft of an automobile for the purpose of providing a suitable connection for the flexible speedometer shaft and to devise a simple and efficient form of reduction gearing adapted to be interposed between the main power shaft of the automobile and the counter shaft.

With the above and other objects in view, the invention consists in the novel features of construction, combination and arrangement of parts to be hereinafter more fully described, claimed and illustrated in the accompanying drawings, in which:

Fig. I is a fragmentary, side elevation of a motor vehicle illustrating my invention when applied.

Fig. II is a detail, sectional view taken on the line II—II of Fig. I.

Fig. III is a fragmentary, vertical, sectional view, showing the motor propeller shaft with my invention applied and the universal joint and its casing.

Fig. IV is a view similar to Fig. I, showing a modification of my invention.

Fig. V is a detail, sectional view taken on the line V—V of Fig. IV.

Fig. VI is an enlarged, sectional view taken on the line VI—VI of Fig. V.

In automobile construction it is found to be highly desirable under certain conditions to provide a mounting for the speedometer shaft whereby the speedometer may be driven from a fixed shaft in which the vibrations incident to the travel of the automobile are eliminated as far as possible, and which is so arranged with respect to the automobile frame as to provide a substantially firm support for the end of the speedometer shaft which is connected thereto. Applicant has provided a simple and efficient form of speedometer shaft mounting which is adapted to be positioned in such a manner as to be actuated by any suitable portion of the main power shaft of the automobile, thus rendering the speedometer mechanism at all times directly responsive to the speed of rotation of the main power shaft of the automobile and permitting the use of a simple and efficient form of reduction gearing. The term "power transmission shaft" as employed in this application is intended to cover broadly both the main transmission shaft and the propeller shaft, and for the purpose of illustration the preferred form of the invention illustrated in Figs. I and III is shown mounted in such a manner as to be actuated by the propeller shaft while a modified form of the invention is illustrated in Figs. IV to VI inclusive as being mounted in proximity to and adapted to be actuated by the transmission shaft of the automobile. It is to be understood however that the form of mounting illustrated in Figs. I to III inclusive may with equal readiness be applied to the transmission shaft, while if it is found to be desirable the mounting illustrated in Figs. IV to VI inclusive may be applied to the propeller shaft.

In the embodiment of the invention illustrated herewith, the engine 10 is adapted to be connected to the propeller shaft 11 in the usual manner through a transmission shaft 11' which is mounted within a transmission case 12 in the usual and ordinary manner. A propeller housing 13 surrounds the propeller shaft 11 and a universal joint 14 connects the propeller shaft and the transmission shaft together comprising the main power shaft of the automobile, the several portions of which rotate in unison for transmitting power from the engine to the rear wheels in the usual manner. The casing 13 encloses the propeller shaft 11, and the universal joint 14 connecting the propeller shaft with the transmission shaft is inclosed by a universal joint comprising a male member 15 and a female member comprising a portion 14' of the transmission case and a member 16' which is adapted to be secured to the transmission case and co-operate with the portion 14' to provide a spherical shaped enclosure within which the member 15 is adapted to fit. The forward end portion of the tube 13 fits slidably within the rear tubular portion of the member 15. The forward end portion of the propeller shaft 11 indicated by 15' has a sliding connection with the main portion of the propeller shaft and the forward portion 15' of the propeller shaft is directly connected to the transmission shaft 11' through the universal joint 14. The forward portion 15' of the propeller shaft is connected to the main portion thereof in such a manner as to be capable of sliding relatively thereto while preventing rotation of these parts with respect to each other. A toe board 17 is positioned at an angle with respect to the dash 18 with which it contacts in a manner well known in automobile construction. A gasoline tank 19 is suitably supported by the dash 18 and a speedometer 20 is mounted upon the instrument board 21 which is in turn supported from the dash. The usual flexible shaft 22 enclosed in the flexible casing 23 is operatively connected to the mechanism of the speedometer at one end while the other end portion thereof extends in proximity to the power shaft of the automobile, said flexible casing being suitably supported intermediate its ends by the dash and toe boards if desired.

On the shaft portion of the member 15' of the universal joint is secured a worm gear 23. A pocket 24 is integrally formed on the male member 15 of the ball and socket joint. Said pocket is provided with the bearing 25 in its end and has disposed between its inner walls the sleeve 26, the sleeve 26 and the bearing 25 being adapted to receive the stub shaft 27 to which is fixed the gear wheel 28. The pocket 24 is further provided with the flange 28'. A flange 30 is integrally formed on the sleeve 26 and is fastened to the flange 28' by screws 32. 33 indicates a central opening provided in the one end of the stub shaft 27. An extended threaded portion 34 of the sleeve 26 is adapted to receive the threaded sleeve 35, said sleeve 35 being adapted to receive in its other end the flexible casing 23. A rotatable pin or stub shaft 36 is secured on its one end to the flexible shaft 22 and has integrally formed on its other end the centrally disposed lug 36', said lug being adapted to engage in the opening 33 in the stub shaft 27 and detachably connect the same thereto.

From the description of the parts given above, the operation of my invention can be readily understood. The worm gear 23 meshes with the gear wheel 28 secured to the stub shaft 27. The stub shaft 27 in turn is coupled to the flexible shaft 22 which has its other end operatively connected to the mechanism of the speedometer 20. When the propeller shaft is rotated, the mechanism of the speedometer is correspondingly actuated. The speedometer can be calibrated accordingly and an accurate registration of the speed of the motor vehicle or the distance traveled can be had.

It is to be observed from the above description of my invention that I have secured the worm gear 23 adjacent and rearward to the universal joint 14, but on the shaft portion 15'. The pocket 24 for mounting the stub shaft 27 is formed on the male member 15 of the ball and socket joint. As the member 15 has a sliding connection with the tube 13, and the shaft 11 has a sliding connection with the shaft portion 15' of the universal joint, any longitudinal motion of the tube 13 and the shaft 11 is dissipated without affecting the member 15 or the universal joint. While the speedometer shaft mounting is illustrated herewith as being positioned in proximity to and cooperating with the forward portion 15' of the propeller shaft, it is to be clearly understood that this mounting may be with equal facility positioned in such a manner as to be actuated by the main portion of the propeller shaft or the transmission shaft. Since the various portions of the engine power shaft rotate in unison it is entirely immaterial whether the speedometer shaft is actuated by one or the other of these portions and the speedometer shaft may accordingly be positioned in proximity to and derive its power from either of the several shaft portions, dependent upon whichever may in practice be found more desirable.

In the Figures IV, V and VI, I have shown a modification of my invention, in which a spur gear for driving the drive train of the speedometer is mounted on the forward side of the universal joint 14, and this modification is described below.

The transmission case 12 is provided with an opening 38 adapted to receive the sleeve 39, said sleeve being provided with a flange 40 whereby it is suitably secured to the transmission case by bolts or other suitable means. A stub shaft 41 is mounted in the sleeve 39 and has a worm gear 42 secured on its one end. Splined on the other end of the stub shaft 41 is the spur gear 43, said gear being held in position by the nut 44.

Another spur gear 45 is secured on the forward portion 45' of the transmission shaft mounted in the gear casing. The gear 45 has a bearing seat 46 on the forward portion of the universal joint and has a flange 47 splined on the shaft 45'. The gear 45 meshes with the gear 43 and thereby actuates the stub shaft 41 relative to the movement of the transmission shaft 11. A pocket 48 is formed in the extended sleeve 39 and provided with the threads 49, (Fig. VI). A sleeve 50 having a flange 51 and threaded on each of its ends, engages the threads 49 in the pocket 48 on its one end while its opposite threaded end receives the threaded sleeve 52. A detachable stub shaft 53 is mounted in the sleeves 50 and 52, said shaft having a collar 54 for engaging the shoulders 55 in the sleeve 50 to prevent longitudinal movement of said shaft in one direction.

The stub shaft 53 is provided with a worm gear 60 which is firmly secured to the shaft and positioned in such a manner as to be adapted to mesh with the worm 42 formed upon one end of the shaft 41 whereby the various parts are properly connected in operative relation. In assembling the parts the shaft 41 and worm 42 carried thereby are inserted through an opening 57 the opening being adapted to be closed by a screw cap 58.

The operation of the modified form of the invention illustrated in Figs. IV to VI inclusive will now be described. The gear 45 being rigidly secured to the transmission shaft 45' will rotate therewith and communicate rotative movement to the shaft 41 through the gear 43 carried thereby. The worm 42 carried by the shaft 41 meshes with the worm gear 60 carried by the shaft 53 in such a manner as to rotate the same at a considerably reduced speed compared with the speed of rotation of the shaft 41. The speedometer shaft is connected to the shaft 53 in the same manner as that in which the speedometer shaft is connected to the counter shaft 27 in the modification shown in Figs. I to III.

I am aware that the particular embodiment of my invention and the modification which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letter Patent, is:

1. In a motor vehicle, a gear casing, a power transmission shaft extending therefrom having a universal joint therein, said casing having a member formed with a spherical surface concentric with said universal joint, a member having a complemental spherical surface forming a universal joint with said first member and enclosing a portion of said shaft, and a countershaft journaled in one of said members and geared to said shaft.

2. In a motor vehicle, a casing, a power transmission shaft extending therefrom having a universal joint therein, a gear on said shaft, a casing for said joint and gear having a ball and socket connection with said first-named casing, a counter-shaft journaled in said second casing and having a gear in mesh with said first gear and a flexible shaft adapted to connect said countershaft with a speedometer.

3. In a motor vehicle, a power shaft having a universal joint connecting opposite portions thereof, a housing for said shaft comprising a flexible portion enclosing said universal joint, and a driving connection mounted in said flexible portion for operative engagement with the power shaft and adapted for connection with a speedometer.

In testimony whereof, I affix my signature.

EDWARD H. BELDEN.